United States Patent [19]

Tadokoro et al.

[11] Patent Number: 4,702,219
[45] Date of Patent: Oct. 27, 1987

[54] SUPERCHARGED ENGINE

[75] Inventors: Tomoo Tadokoro; Haruo Okimoto; Toshimichi Akagi, all of Hiroshima, Japan

[73] Assignee: Mazda Motor Corporation, Japan

[21] Appl. No.: 769,662

[22] Filed: Aug. 27, 1985

[30] Foreign Application Priority Data

Aug. 29, 1984 [JP] Japan ................................. 59-179655

[51] Int. Cl.⁴ ............................................ F02D 23/00
[52] U.S. Cl. ...................................... 123/559; 60/290
[58] Field of Search ................. 123/559, 564; 60/289, 60/290

[56] References Cited

U.S. PATENT DOCUMENTS 4,484,556  11/1984  Okimoto et al. ........... 123/559 R X

FOREIGN PATENT DOCUMENTS

| 153817 | 12/1980 | Japan | 123/559 R |
| 156225 | 12/1980 | Japan | 123/559 R |
| 519 | 1/1981 | Japan | 123/559 R |
| 5781 | 2/1984 | Japan . | |
| 178927 | 9/1985 | Japan | 123/559 R |

Primary Examiner—Michael Koczo
Assistant Examiner—Richard R. Cole
Attorney, Agent, or Firm—Gerald J. Ferguson, Jr.; Michael P. Hoffman; Michael J. Foycik

[57] ABSTRACT

In a supercharged engine, a part of the pressurized air pressurized by a supercharger is introduced into the exhaust system as secondary air in a predetermined operating range of the engine. The supercharging pressure is controlled to be lower when introduction of secondary air is effected than when it is not effected.

23 Claims, 2 Drawing Figures

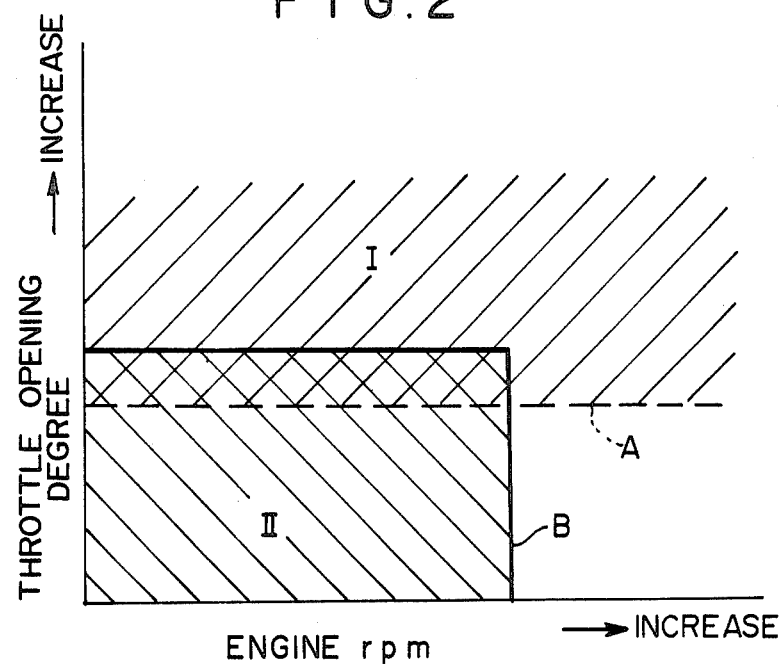

SUPERCHARGED ENGINE

BACKGROUND OF THE INVENTION

1. Field of the Invention

This invention relates to a supercharged engine, and more particularly to a supercharged engine in which a part of the pressurized air pressurized by a supercharger is introduced into the exhaust system as secondary air.

2. Description of the Prior Art

There is disclosed, in Japanese Patent Publication No. 59(1984)-5781, for instance, a supercharged engine in which a part of the pressurized air pressurized by a supercharger is introduced into the exhaust system as secondary air.

Generally, the supercharger must be able to discharge a large amount of air and the supercharging pressure in the supercharging passage must be high in order to ensure a sufficient amount of air at high speed and heavy load. On the other hand, feeding of the secondary air to the exhaust system is interrupted at high speed and heavy load in order to protect the exhaust system. That is, the secondary air is introduced into the exhaust system when the amount of supercharging air to the engine is zero or small. When the amount of supercharging air is small, an excessive amount of secondary air is apt to be fed to the exhaust system due to high supercharging pressure. In other words, for the purpose of feeding secondary air, the supercharger must be kept operated even in operating ranges in which supercharging is not effected and the pressure of the secondary air fed to the exhaust system cannot be sufficiently lowered even if excessive pressurized air is relieved through a relief passage. Therefore, high accuracy is required in controlling the flow of the secondary air.

If the amount of intake air is to be detected, e.g., in order to control fuel injection, for instance, by subtracting the amount of secondary air fed to the exhaust system from the total amount of air flowing into the intake passage through the air cleaner, the ratio of the amount of secondary air to the total amount becomes too large, when the amount of secondary air is excessive, to detect the amount of intake air with high accuracy, thereby adversely affecting fuel injection control.

SUMMARY OF THE INVENTION

In view of the foregoing observations and description, the primary object of the present invention is to provide a supercharged engine having a mechanism for introducing secondary air into the exhaust system in which the secondary air can be introduced into the exhaust system in a proper amount.

The supercharged engine in accordance with the present invention is characterized by having means for controlling the supercharging pressure in the supercharging passage so that the supercharging pressure is lower when introduction of secondary air is effected than when it is not effected.

In accordance with the present invention, the secondary air can be introduced in a proper amount since the supercharging pressure is lowered when introduction of the secondary air is effected, and at the same time, driving loss of the supercharger can be reduced. Further, durability of the supercharger can be improved by lowering the supercharging pressure when high pressure is not necessary. Further, accuracy in detecting the amount of intake air can be improved since the ratio of the amount of secondary air to the total amount of air introduced into the intake passage through the air cleaner is small.

BRIEF DESCRIPTION OF THE DRAWINGS

FIG. 2 is a view for illustrating the operating range of the engine in which supercharging is to be accomplished and the operating range in which secondary air is to be fed to the exhaust system.

DESCRIPTION OF THE PREFERRED EMBODIMENT

Figure 1:
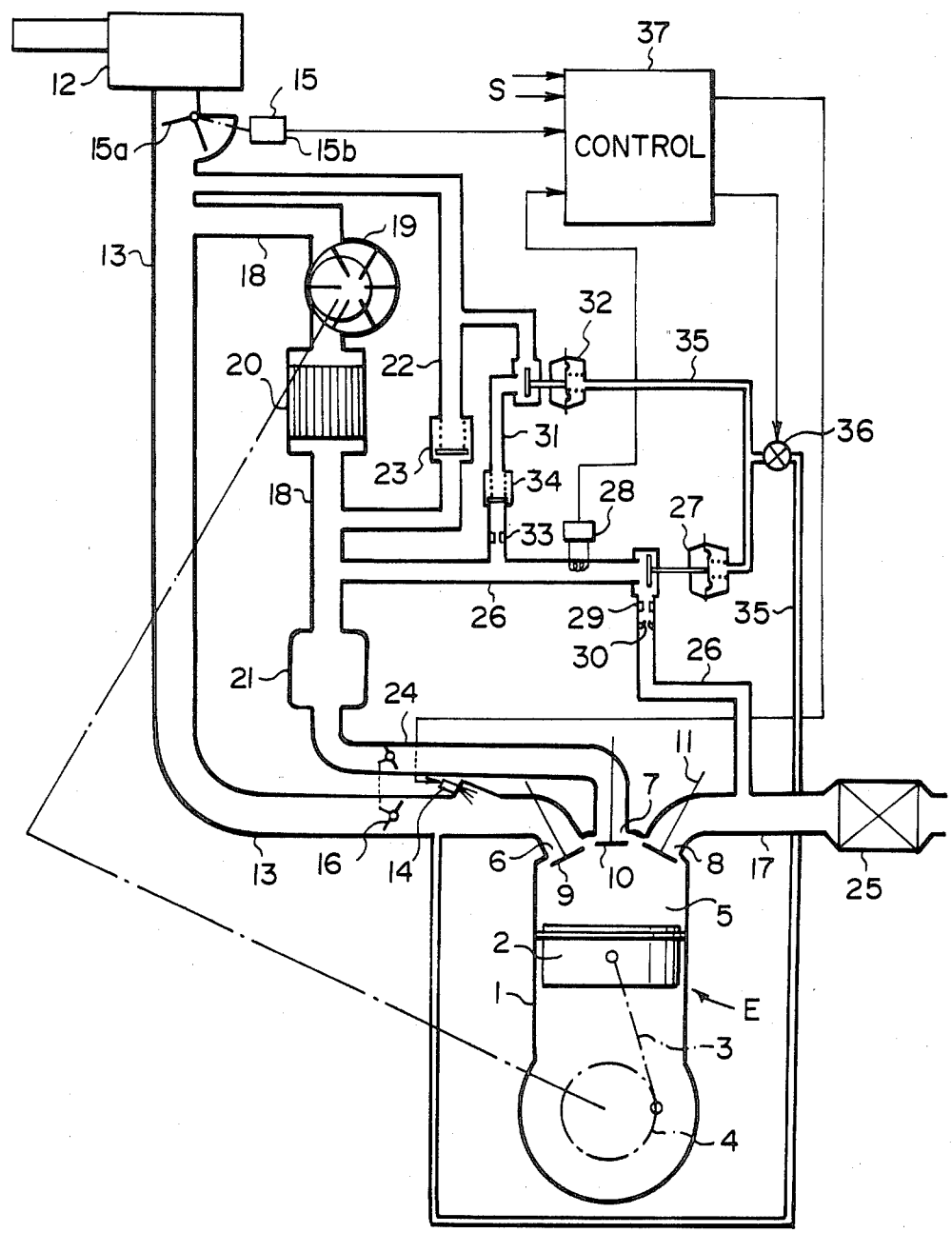
FIG. 1 is a schematic view of a supercharged engine in accordance with an embodiment of the present invention.

In FIG. 1, an engine E of this embodiment has a piston 2 which reciprocates to drive a crankshaft 4 by way of a connecting rod 3. A main intake port 6, supercharging port 7 and exhaust port 8 open into a combustion chamber 5 defined by a cylinder 1 and the piston 2.

The main intake port 6, supercharging port 7 and exhaust port 8 are respectively provided with a main intake valve 9, sub-intake valve 10 and exhaust valve 11 which are opened and closed by a timing cam (not shown) synchronized with the crankshaft 4. To the main intake port 6 is connected a main intake passage 13 which is provided with an air cleaner 12 at the upstream end thereof. A fuel injection valve 14 is provided in the main intake passage 13, and an airflow meter 15 and a throttle valve 16 are disposed along the main intake passage 13 between the air cleaner 12 and the fuel injection valve 14 in this order from upstream. The airflow meter 15 comprises a measuring flap 15a disposed in the main intake passage 13 to be rotated according to the flow of intake air and a potentiometer 15b for detecting the position of the measuring flap 15a. To the exhaust port 8 is connected an exhaust passage 17 provided with an exhaust gas cleaning device 25.

To the supercharging port 7 is connected a supercharging passage 18 branching from a portion of the main intake passage 13 downstream of the airflow meter 15. A supercharger 19 is disposed in the supercharging passage 18 at an intermediate portion thereof. The supercharger 19 comprises an air pump of a vane type and is driven by the rotational force of the crankshaft 4 to suck air in the main intake passage 13 and discharge pressurized air into the combustion chamber 5 through the supercharging port 7. The sub-intake valve 10 is opened and closed in response to the crankshaft 4 to be opened to effect supercharging between a latter part of the intake stroke when the main intake valve 9 closes the main intake port 6 and an earlier part of the compression stroke, and to be closed later than the main intake valve by a predetermined time interval.

An inter cooler 20, surge tank 21 and supercharging amount control valve 24 are disposed in the supercharging passage 18 downstream of the supercharger 19. The supercharging amount control valve 24 is opened and closed in response to the throttle valve 16 in the main intake passage 13. One end of a relief passage 22 is connected to a portion of the supercharging passage 18 downstream of the supercharger 19 and the other end of the relief passage 22 is connected to a portion of the main intake passage 13 upstream of the connection of the supercharging passage 18 to the main intake passage 13. The relief passage 22 is provided at an intermediate portion with a relief valve 23 which is of a check valve type and relieves pressurized air toward the upstream side when the supercharging pressure exceeds a predetermined value, thereby limiting the maximum supercharging pressure.

A secondary air passage 26 branches from the supercharging passage 18 downstream of the supercharger 19 and is connected to the exhaust passage 17 upstream of the exhaust gas cleaning device 25. The secondary air passage 26 is provided with a secondary air cut valve 27 which selectively opens and closes the secondary air passage 26 to control the feeding of the secondary air. The secondary air passage 26 is further provided with a flow sensor 28 of a hot-wire type upstream of the secondary air cut valve 27, a measurement orifice 29 (the purpose of which will become apparent later) and a check valve 30 for preventing reflux of exhaust gas downstream of the secondary air cut valve 27.

A secondary air relief passage 31 branches from the secondary air passage 26 upstream of the flow sensor 28 and is connected to the relief passage 22 downstream of the relief valve 23. The secondary air relief passage 31 is provided with a secondary-air-relief cut valve 32 which opens and closes the secondary air relief passage 31 to permit or inhibit relief of pressurized air therethrough. The secondary air relief passage 31 is further provided with a measurement orifice 33 (the purpose of which will become apparent later) and a secondary air relief valve 34 upstream of the secondary-air relief cut valve 32. The secondary air relief valve 34 is set to be opened at a preset pressure lower than that of the relief valve 23.

The secondary air cut valve 27 and the secondary-air-relief cut valve 32 are opened and closed in synchronization with each other. The secondary air cut valve 27 and the secondary-air-relief cut valve 32 are opened under the force of intake vacuum in the main intake passage 13 introduced by a vacuum introduction passage 35 which is provided with a three-way solenoid valve 36 for selectively communicating the valves 27 and 32 with the main intake passage 13 or the atmosphere.

Fuel injection from the fuel injection valve 14 and switching of the three-way solenoid valve 36 are controlled by a control signal from a control unit 37. To the control unit 37 are input a total flow signal from the airflow meter 15, a secondary air flow signal from the flow sensor 28 in the secondary air passage 26, and other detection signals S such as an engine speed signal and a load signal (throttle opening degree signal). The control unit 37 determines the amount of fuel to be injected and the operating range of the engine in which secondary air is to be fed to the exhaust system (this will be referred to as "secondary air feed range", hereinbelow) on the basis of these signals, and controls the three-way solenoid valve 36 to communicate the valves 27 and 32 with the main intake passage 13 when the operating condition of the engine is in the secondary air feed range.

When the operating condition of the engine E is in the supercharging range in which supercharging is to be effected, that is, when the operating condition of the engine E is in the range I shown in FIG. 2 in which the throttle valve opening degree (engine load) is higher than a preset value indicated by dotted line A, the throttle valve 16 in the main intake passage 13 and the supercharging amount control valve 24 in the supercharging passage 18 are opened by a degree corresponding to the engine load, and pressurized air fed from the supercharger 19 is introduced into the combustion chamber 5 when the sub-intake valve 10 is opened in a latter part of the intake stroke. The excess of the pressurized air fed from the supercharger 19 is relieved through the relief passage 22 into the main intake passage 13 downstream of the airflow meter 15.

On the other hand, when the operating condition of the engine is in the secondary air feed range, that is, when the operating condition of the engine is in the range II defined by the solid line B in which the throttle valve opening degree (engine load) and the engine speed are lower than preset values, the three-way solenoid valve 36 is operated to open both the secondary air cut valve 27 and the secondary-air-relief cut valve 32, thereby introducing secondary air into the exhaust system. At this time, the pressure in the secondary air passage 26 which is equal to the pressure in the supercharging passage 18 is lowered since a part of the pressurized air is relieved through the secondary air relief passage 31, and is maintained at a preset value defined by the secondary air relief valve 34. Then, a part of the pressurized air flowing through the secondary air passage 26 branches into the secondary relief passage 31 according to the ratio of the diameter of the measurement orifice 29 to that of the measurement orifice 33, whereby secondary air is introduced into the exhaust passage 17 at a predetermined flow rate under a predetermined pressure.

Thus, in the secondary air feed range II, the supercharging pressure is lowered so that the secondary air is not excessively introduced into the exhaust system and load on the supercharger is reduced, thereby reducing driving loss and improving durability of the supercharger. On the other hand, in the supercharging range I in which introduction of secondary air is not effected, the supercharging pressure is maintained at a high preset value defined by the relief valve 23 to ensure sufficient supercharging amount under heavy load.

In the overlapping portion of the supercharging range I and the secondary air feed range II in which both the supercharging and the introduction of the secondary air are to be effected, engine load is relatively light in the supercharging range and the supercharging amount may be relatively small, and accordingly, the supercharging amount necessary for the operating condition can be ensured even if the supercharging pressure is lowered upon opening of the secondary air cut valve 27 and the secondary-air-relief cut valve 32.

The amount of intake air is determined by subtracting the flow rate of the secondary air detected by the flow sensor 28 in the secondary air passage 26 from the total flow rate detected by the airflow meter 15 in the main intake passage 13. The pressurized air flowing in the relief passage 22 and the secondary air relief passage 31 is returned to the main intake passage 13 downstream of the airflow sensor 15 so as not to affect the measurement.

In the embodiment described above, the secondary air relief valve 34 is provided in order to maintain substantially constant the supercharging pressure during introduction of the secondary air or the secondary-air feeding pressure. However, even without the secondary air relief valve 34, the secondary air can be introduced into the exhaust system by a practically proper amount by virtue of the measurement orifices 29 and 33.

Though in the embodiment described above, the secondary air relief passage 31 branching from the secondary air passage 26 is provided in order to lower the supercharging pressure during introduction of the secondary air, other various means may be employed instead of the secondary air relief passage 31. For example, a second relief passage having a relief valve which can be opened under a pressure lower than the preset pressure of the relief valve 23 may be provided in parallel to the relief passage 22 so that the second relief passage is opened in response to introduction of the secondary air. Otherwise, an opening pressure variable valve may be employed as the relief valve 23 so that the opening pressure is lowered during introduction of the secondary air. Further, when the discharging pressure of the supercharger is variable, the supercharging pressure during introduction of the secondary air may be lowered by lowering the discharge pressure of the supercharger.

Further, the relief air may be relieved to the atmosphere instead of relieving it to the intake passage, though a flow sensor for measuring the amount of air relieved to the atmosphere becomes necessary.

Further, though the supercharging range I and the secondary air feed range II overlap each other in the embodiment described above, they need not overlap each other. That is, the preset value defining the minimum engine load in the supercharging range may be larger than the preset value defining the maximum engine load in the secondary air feed range.

What is claimed is:

1. A supercharged engine having an intake system and an exhaust system comprising a supercharger disposed in an intake passage of the intake system to pressurize at least a part of the intake air and feed pressurized air to cylinders at least in a first predetermined operating range of the engine, a secondary air passage which is connected to the intake passage downstream of the supercharger at one end and to the exhaust system at the other end and introduces at least a part of the pressurized air at least in a second predetermined operating range of the engine, a secondary air control valve means provided in the secondary air passage to close the secondary air passage at least when the engine operates under heavy load, and a supercharging pressure control means for controlling the supercharging pressure in the intake passage downstream of the supercharger such that the supercharging pressure has a first predetermined pressure when introduction of the secondary air to the exhaust system is effected and the supercharging pressure has a second predetermined pressure when introduction of the secondary air to the exhaust system is not effected, wherein the first predetermined pressure is lower than the second predetermined pressure.

2. A supercharged engine as defined in claim 1 further comprising a relief means including a first relief passage connected to the intake passage downstream of the supercharger and a first relief valve provided in the first relief passage to open the first relief passage when the pressure in the intake passage downstream of the supercharger exceeds a preset value.

3. A supercharged engine as defined in claim 2 in which said supercharging pressure control means comprises a second relief passage connected to the intake passage downstream of the supercharger in parallel to the first relief passage, a valve means for opening and closing the second relief passage and a second relief valve which is disposed in the second relief passage and opens when the pressure in the intake passage downstream of the supercharger exceeds a preset value lower than the preset value for the first relief valve, the valve means opening in response to opening of the secondary air control valve means in said second operating range of the engine.

4. A supercharged engine as defined in claim 3 in which each of said valve means in the second relief passage and the secondary air control valve means comprises a diaphragm associated with a valve body for opening and closing the corresponding passage, an air chamber and a three-way solenoid valve which selectively connect the air to the atmosphere or the intake passage downstream of the throttle valve, the diaphragm being adapted to be displaced to drive the valve body to open the corresponding passage when intake vacuum is introduced into the air chamber, said three-way solenoid valve being controlled to connect both the air chambers of the valve means to the intake passage in said second predetermined operating range of the engine.

5. A supercharged engine as defined in claim 3 in which said second relief passage is connected to the intake passage by way of the secondary air passage.

6. A supercharged engine as defined in claim 3 in which said second predetermined operating range of the engine is a range in which the engine rpm are not higher than a preset value and the engine load is not heavier than a preset value.

7. A supercharged engine as defined in claim 2 in which the downstream end of said first relief passage is connected to the intake passage upstream of the supercharger to relieve the pressurized air to the intake passage upstream of the supercharger.

8. A supercharged engine as defined in claim 1 in which said intake system comprises a primary intake passage through which intake air is introduced into the cylinder by intake vacuum and a secondary intake passage in which said supercharger is disposed and pressurized air is introduced into the cylinder at least in the compression stroke through the secondary intake passage.

9. A supercharged engine as defined in claim 8 in which said intake system further comprises a valve device which is provided in the secondary intake passage downstream of the supercharger and permits air flow through the secondary intake passage when the engine load is heavier than a preset value.

10. A supercharged engine as defined in claim 9 in which said preset value of the engine load is defined by the opening degree of a throttle valve disposed in the primary intake passage.

11. A supercharged engine as defined in claim 10 in which the valve device in the secondary intake passage is an auxiliary throttle valve which is operated in response to the throttle valve in the primary intake passage.

12. A supercharged engine as defined in claim 9 in which said supercharger is driven by an engine output shaft.

13. A supercharged engine as defined in claim 9 further comprising a relief means including a first relief passage connected to the secondary intake passage downstream of the supercharger and a first relief valve provided in the first relief passage to open the first relief passage when the pressure in the secondary intake passage downstream of the supercharger exceeds a preset value.

14. A supercharged engine as defined in claim 13 in which said supercharging pressure control means comprises a second relief passage connected to the secondary intake passage downstream of the supercharger in parallel to the first relief passage, a valve means for opening and closing the second relief passage and a second relief valve which is disposed in the second relief passage and opens when the pressure in the secondary intake passage downstream of the supercharger exceeds a preset value lower than the preset value for the first relief valve, the valve means opening in response to opening of the secondary air control valve means in said second operating range of the engine.

15. A supercharged engine as defined in claim 14 in which each of said valve means in the second relief passage and the secondary air control valve means comprises a diaphragm associated with a valve body for opening and closing the corresponding passage, an air chamber and a threeway solenoid valve which selectively connect the air to the atmosphere or the intake passage downstream of the throttle valve, the diaphragm being adapted to be displaced to drive the valve body to open the corresponding passage when intake vacuum is introduced into the air chamber, and said three-way solenoid valve being controlled to connect both the air chambers of the valve means to the primary intake passage in said second predetermined operating range of the engine.

16. A supercharged engine as defined in claim 14 in which said second relief passage is connected to the secondary intake passage by way of the secondary air passage.

17. A supercharged engine as defined in claim 14 in which said second predetermined operating range is of the engine is a range in which the engine rpm are not higher than a preset value and the engine load is not heavier than a preset value.

18. A supercharged engine as defined in claim 14 in which said secondary intake passage is joined to the primary intake passage at the upstream end, a first airflow sensor is provided in the primary intake passage upstream of the junction of the primary intake passage and the secondary intake passage, said first and second relief passages are connected to the primary intake passage downstream of the first airflow sensor, and a second airflow sensor is provided in the secondary air passage, and said engine further comprises an electronic control fuel injection system which controls the amount of fuel to be injected according to the amount of intake air calculated by subtracting the output of the second airflow sensor from the output of the first airflow sensor.

19. A supercharged engine as defined in claim 1 in which said supercharger is driven by an engine output shaft.

20. A supercharged engine as defined in claim 1 in which said supercharging pressure control means comprises a relief passage connected to the intake passage downstream of the supercharger, and a control valve means which is disposed in the relief passage and increases the pressure in the intake passage downstream of the supercharger when the engine load is heavier than a predetermined value and introduction of the secondary air is interrupted.

21. A supercharged engine as defined in claim 20 in which said control valve closes the relief passage when the engine load is heavier than the predetermined value and opens the same when introduction of the secondary air is effected.

22. A supercharged engine as defined in claim 21 in which the supercharging pressure control means is provided with a pressure relief valve in the relief passage.

23. A supercharged engine as defined in claim 1 further comprising a control means which detects the engine load and delivers a control signal to the secondary air control valve means to interrupt introduction of the secondary air when the engine load is heavier than a predetermined value and delivers a control signal to the supercharging pressure control means to increase the supercharging pressure when the engine load is not lighter than the predetermined value.

* * * * *